(12) United States Patent
Chou et al.

(10) Patent No.: US 7,112,906 B2
(45) Date of Patent: Sep. 26, 2006

(54) MOTOR ROTOR AND MANUFACTURING METHOD THEREOF

(75) Inventors: Yi-Fang Chou, Kaohsiung (TW);
Tsu-Liang Lin, Taipei (TW);
Kuo-Cheng Lin, Taoyuan (TW);
Wen-Shi Huang, Taoyuan (TW)

(73) Assignee: Delta Electronics, Inc., Taoyuan Sien (TW)

( * ) Notice: Subject to any disclaimer, the term of this patent is extended or adjusted under 35 U.S.C. 154(b) by 45 days.

(21) Appl. No.: 10/779,777

(22) Filed: Feb. 18, 2004

(65) Prior Publication Data

US 2005/0012418 A1 Jan. 20, 2005

(30) Foreign Application Priority Data

Jul. 16, 2003 (TW) .............................. 92119375 A

(51) Int. Cl.
*H02K 21/12* (2006.01)
*H02K 1/28* (2006.01)

(52) U.S. Cl. ...................... 310/156.12; 310/156.28; 310/156.29; 310/156.31; 417/423.1; 417/354

(58) Field of Classification Search ........... 310/154.03, 310/154.08, 154.09, 154.12, 156.08, 156.12, 310/156.28, 156.29, 156.31; 417/354, 423.1; 416/3
See application file for complete search history.

(56) References Cited

U.S. PATENT DOCUMENTS

| 4,625,392 | A | * | 12/1986 | Stokes ........................ 29/598 |
| 5,500,994 | A | * | 3/1996 | Itaya ........................... 29/598 |
| 5,998,902 | A | * | 12/1999 | Sleder et al. ................ 310/153 |
| 6,196,802 | B1 | * | 3/2001 | Matsumoto ............. 416/229 R |
| 6,616,422 | B1 | * | 9/2003 | Hsieh ......................... 417/354 |
| 6,674,204 | B1 | * | 1/2004 | Horng et al. .......... 310/156.12 |
| 2001/0048259 | A1 | * | 12/2001 | Ueda ..................... 310/154.09 |
| 2004/0075356 | A1 | * | 4/2004 | Horng et al. .......... 310/154.08 |

* cited by examiner

*Primary Examiner*—Tran Nguyen
(74) *Attorney, Agent, or Firm*—Birch, Stewart, Kolasch and Birch, LLP

(57) ABSTRACT

A motor rotor. The motor rotor adapted to be used in a fan includes a hub, a metal plate and a magnet. The metal plate has a first end and a second end. The metal plate is disposed in the hub. The magnet is disposed in the metal plate. A method for manufacturing a motor rotor mentioned includes providing a metal plate having a first end and a second end; connecting the first and second ends to shape the metal plate as a ring; placing the metal plate in a hub; and placing a magnet in the metal plate.

9 Claims, 8 Drawing Sheets

MOTOR ROTOR AND MANUFACTURING METHOD THEREOF

This Non-provisional application claims priority under 35 U.S.C. § 119(a) on patent application Ser. No. 092119375 filed in TAIWAN on Jul. 16, 2003, the entire contents of which are hereby incorporated by reference.

BACKGROUND OF THE INVENTION

1. Field of the Invention

The present inventions relates in general to a motor rotor and in particular to a method of manufacturing the rotor structure of the motor.

2. Description of the Related Art

A conventional fan is shown in FIG. 1, including a rotor assembly 1, a stator 2 and a frame 3. The rotor assembly 1 includes a blade structure 11 having a hub 111 and blades 112 disposed around the periphery of the hub 111. A metal shell 12 and a magnet 13 are disposed on the interior side of the hub 111 accordingly. A shaft 113 is placed in the inner center of the hub 111 and a washer 14 is placed on the shaft 113. The stator 2 includes a sleeve 21, a coil 22, an upper insulation spacer 23, an upper pole plate 24, a lower insulation spacer 25, a lower pole plate 26 and a circuit board 27. The sleeve 21 is a hollow tube and a ball bearing 211 is disposed in the upper interior part of the sleeve 21. The lower portion of the sleeve 21 has a self-lubricating bearing 212. Several bushings are placed between the ball bearing 211 and the self-lubricating bearing 212. The upper insulation spacer 23 and the upper pole plate 24 are placed sequentially on the top of coil 22, and then encircling the outer periphery of the sleeve 21. The lower insulation spacer 25, the lower pole plate 26 and the circuit board 27 are also sequentially placed encircling the outer periphery of sleeve 21. Thus, the top surface of the lower insulation spacer 25 contacts the lower end of coil 22. The shaft 113 of the rotor assembly 1 passes through the opening in ball bearing 211 and the self-lubricating bearing 212 and a c-ring 15 is locked at the end of the shaft 113 to connect the rotor assembly 1 and the stator 2. Further, a sensor is disposed on the circuit board 27 for detecting and controlling the magnetic field of the stator 2. Finally, the bottom surface of the stator 2 is connected to the frame 3, thereby completing the fan assembly.

The metal shell 12, however, typically is ring-shaped and formed by molding. In detail, the metal is cut first, and molded in a die-cast. This method is costly and time consuming, and requires a special die for each new different design such that the formed die can not be shared and easily modified.

SUMMARY OF THE INVENTION

An object of the present invention is to provide a motor rotor that solves the above mentioned problem.

The present invention discloses a motor rotor adapted to be used in a fan, including a hub, a metal plate and a magnet. The metal plate has a first end and a second end and is disposed inside the hub. The magnet is disposed in the metal plate.

The hub may be ring-shaped and have a flange extended toward the center of the hub for supporting the metal plate.

The metal plate may further include a serrated edge for supporting the magnet.

The metal plate may be ring-shaped, and the serrated edge contact an inner surface of the flange.

At least one blade may be disposed at the exterior periphery of the hub.

The first and second ends are engaged with each other to form an occlusive seam to main the ring-shaped metal plate.

The metal plate may further include salient teeth, and the hub may have a recess corresponding to the salient teeth to maintain the ring-shaped metal plate.

The surface of the metal plate may have a pressure generating pattern for providing the stress and increasing the friction between the metal plate and the hub.

The present invention further provides a method for manufacturing a motor rotor. The method includes providing a metal plate having a first end and a second end; connecting the first and second ends to shape the metal plate as a ring; placing the metal plate in a hub; and placing a magnet in the metal plate.

The method may further include a step of bending the serrated edge to a predetermined angle.

The first and second ends can be engaged together to prevent separation thereof after bending the metal plate.

The first end has a protrusion and the second end has a recess.

The first and second ends respectively have a salient tooth and the hub may have a recess. The salient teeth are engaged with the recess to maintain the ring-shaped metal plate.

The first and second ends are engaged together to form an occlusive seam to main the ring-shaped metal plate.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings, which are given by way of illustration only, and thus are not limitative of the present invention, and wherein.

DETAILED DESCRIPTION OF THE INVENTION

Figure 1:
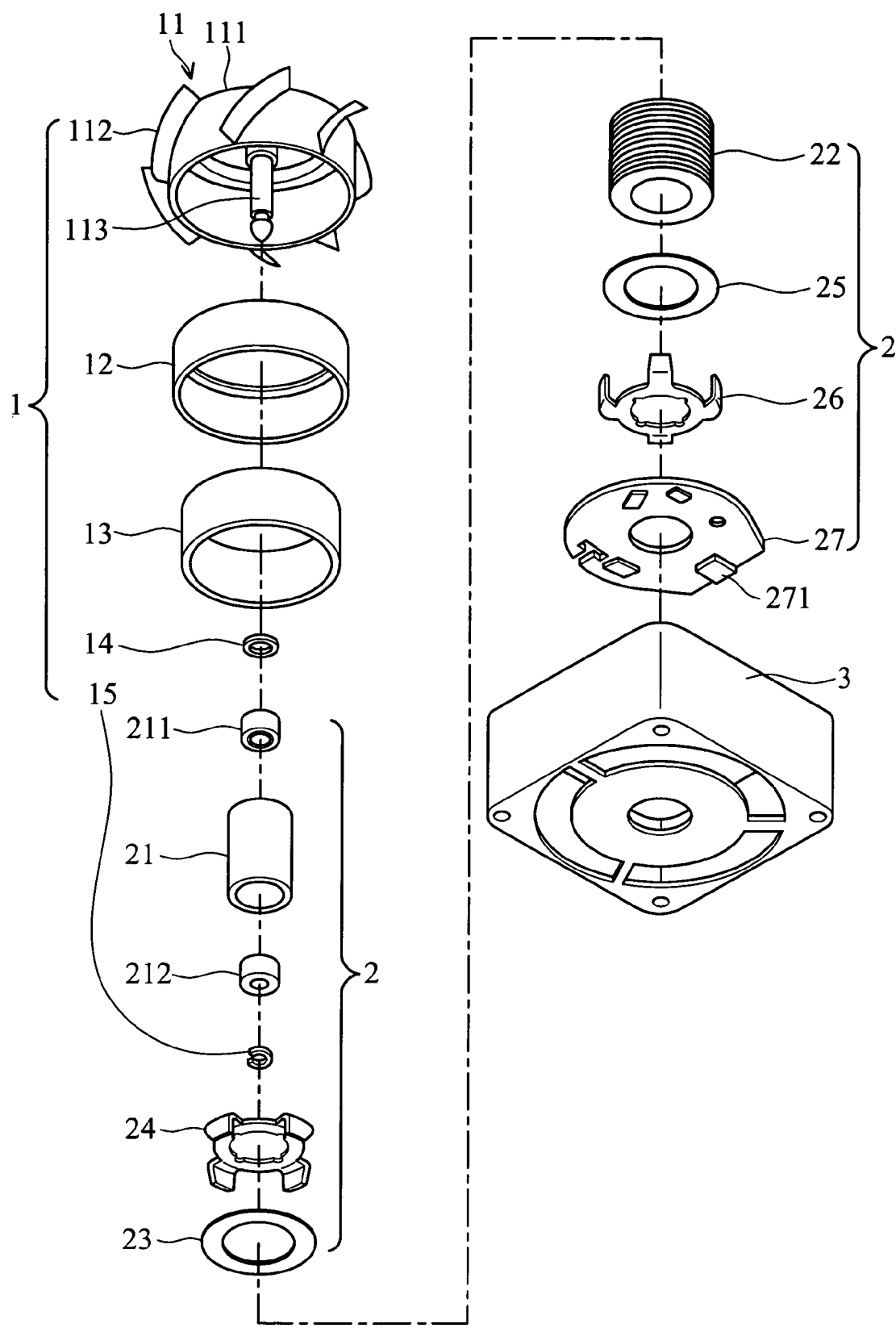
FIG. 1 is an exploded diagram of a conventional fan.
Figure 2A:
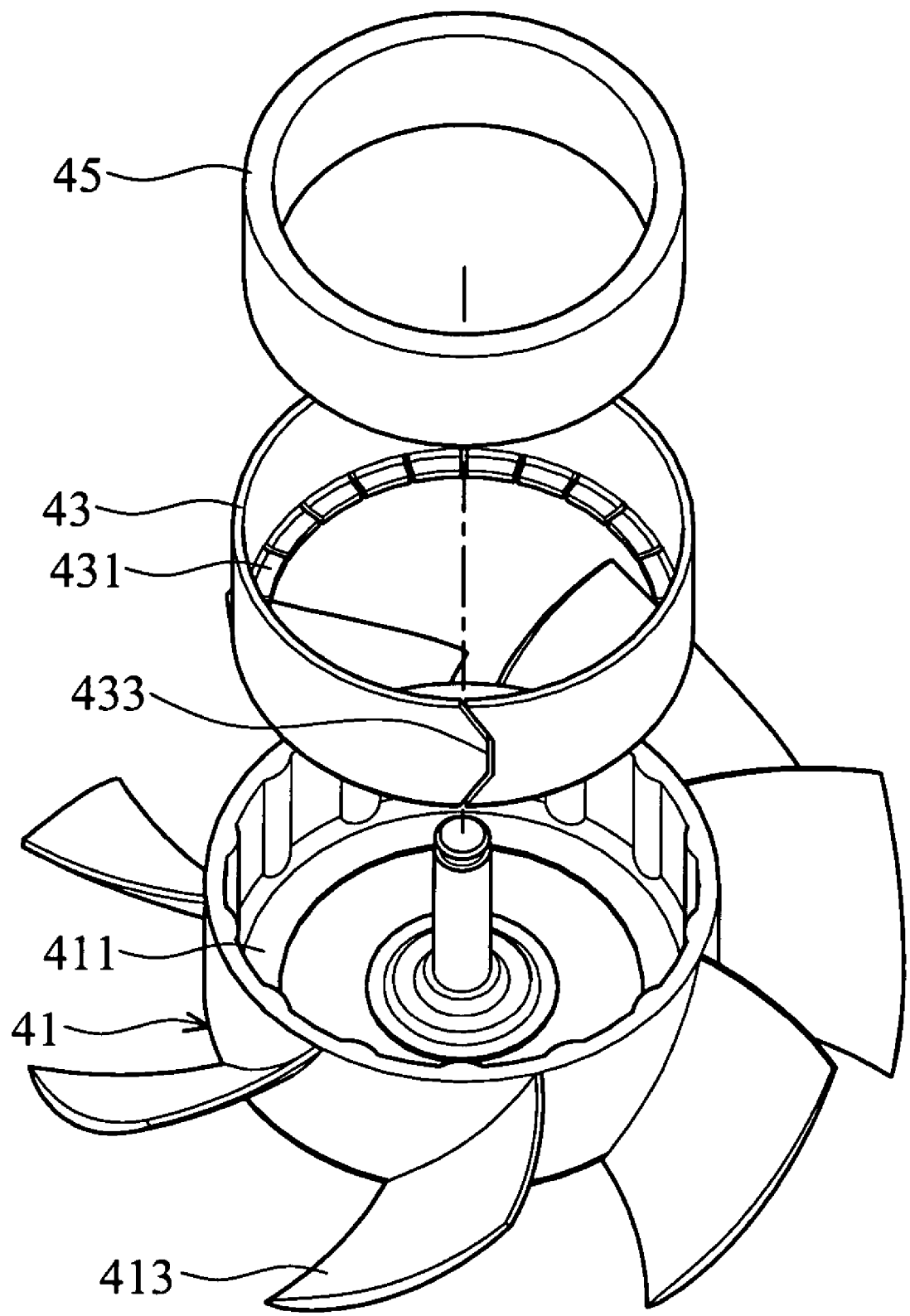
FIG. 2a is a schematic diagram of a motor rotor of the first embodiment in accordance with the present invention.
Figure 2B:
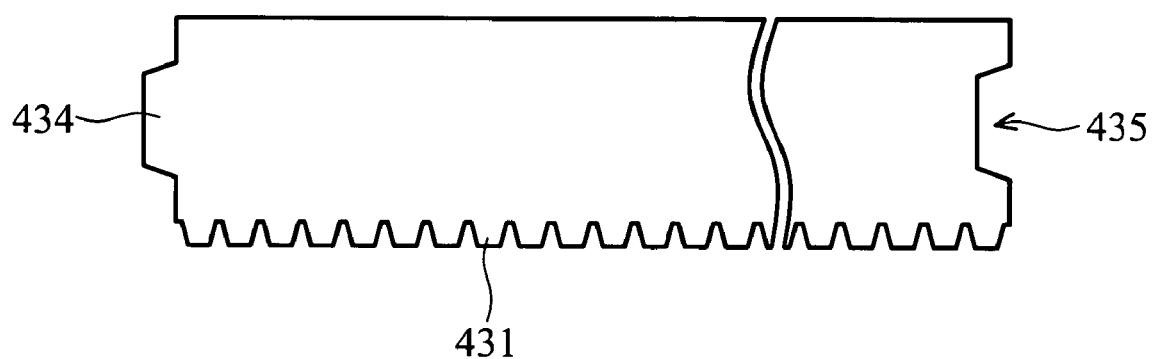
FIG. 2b is a schematic diagram of a metal plate in accordance with the present invention.

Referring to FIGS. 2a and 2b, a first embodiment of a motor rotor of the present invention includes a hub 41, a metal plate 43 and a magnet 45. The metal plate 43 is disposed around the interior periphery of the hub 41 and the metal plate 43 has a serrated edge 431. The magnet 45 is disposed in the ring-shaped metal plate 43 and supported by the serrated edge 431.

As shown in FIG. 2a, the hub 41 is ring-shaped and has a flange 411 extending toward the center of the hub 41. The flange 411 supports the ring-shaped metal plate 43, and the serrated edge 431 thereof contacts an inner surface of the flange 411 after assembly. A plurality of blades 413 are disposed encircling at the exterior periphery of the hub 41. In this embodiment, the lateral of the metal plate 43 has an occlusive seam 433.

A method for manufacturing and assembling the motor rotor of the present invention is described in the following.

Figure 2C:
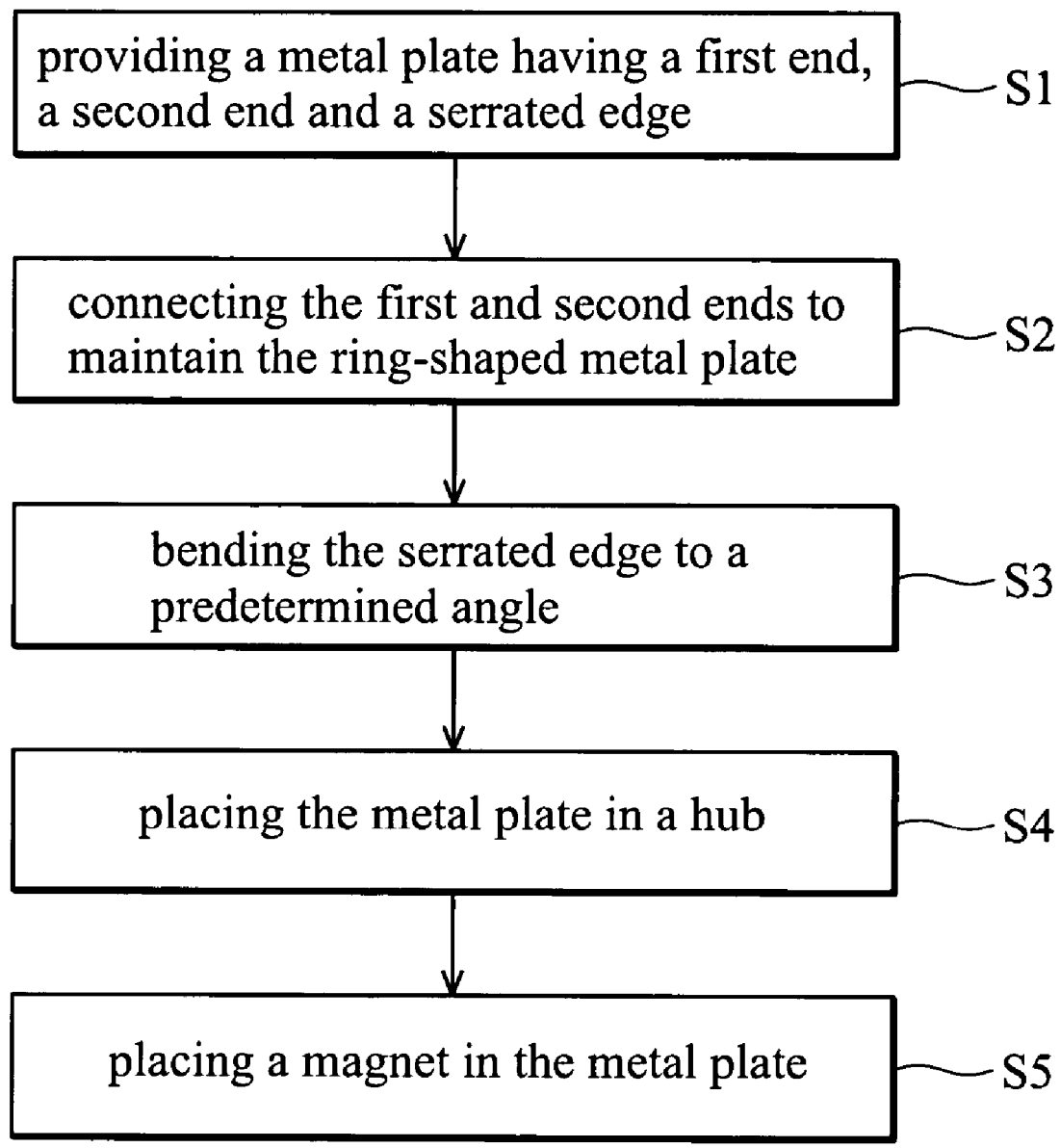
FIG. 2c is a flow chart of the method for manufacturing the motor rotor of the first embodiment.

Referring to FIGS. 2a, 2b and 2c, the method of manufacturing a motor rotor of the first embodiment includes providing a metal plate with a first end, a second end and a serrated edge (step S1); connecting the first and second ends to maintain ring-shaped of the metal plate (step S2); bending the serrated edge to a predetermined angle (step S3); placing the ring-shaped metal plate in a hub (step S4); and placing a magnet in the metal plate (step S5).

In step S1, the metal plate includes the first end 434, the second end 435 and the serrated edge 431.

In step S2, the metal plate is molded by roller, and the first end 434 and the second end 435 are connected to form a ring. The occlusive seam 433 mentioned above is formed by connecting the first and second ends 434 and 435.

In step S3, the serrated edge 431 is bent to the predetermined angle to form the top of the metal plate 43.

In step S4, the metal plate 43 is disposed in the hub 41. The hub 41 is ring-shaped and has a flange 411 extending toward the center of the hub 41. The flange 411 supports the metal plate 43. The serrated edge 431 of the metal plate 43 contacts the inner surface of flange 411. In this embodiment, the metal plate 43 has the serrated edge 431 and after bending, the serrated edge 431 is perpendicular to the central axis of the hub 41 such that the metal plate 43 securely connected to the hub 41 by the serrated edge 431. After assembly, the ring-shaped metal plate 43 is maintained by radial force of the hub 41.

Moreover, the first end 434 and the second end 435 are engaged together. In the embodiment, the first end 434 has a protrusion and the second end 435 has a recess. The protrusion and the recess may be connected as shown in FIG. 2a to prevent the movement of the metal plate along the axial direction and separation of the two ends of the metal plate, thus maintaining the ring shape thereof.

Figure 3A:
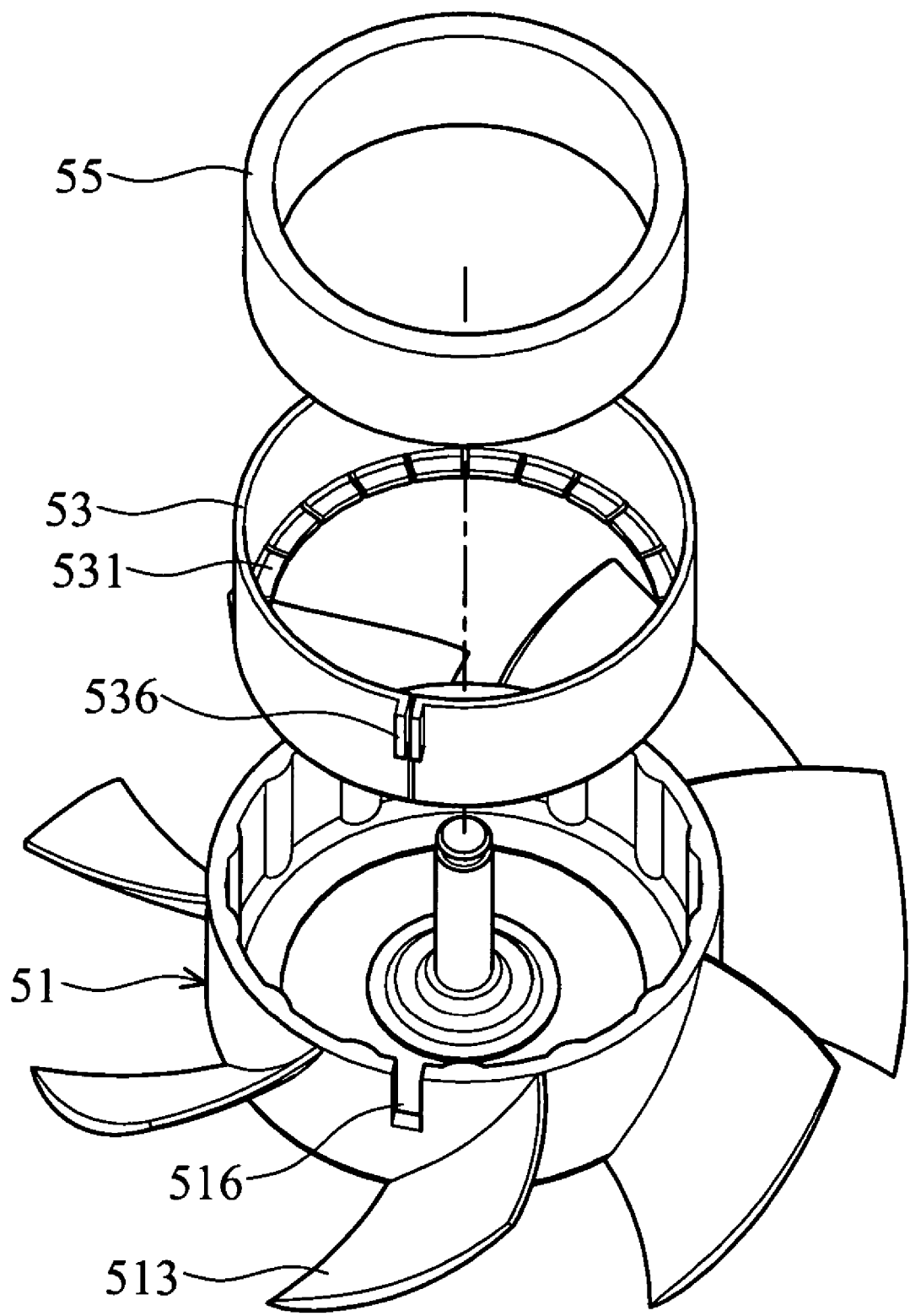
FIG. 3a is a schematic diagram of a motor rotor of the second embodiment in accordance with the present invention.
Figure 3B:
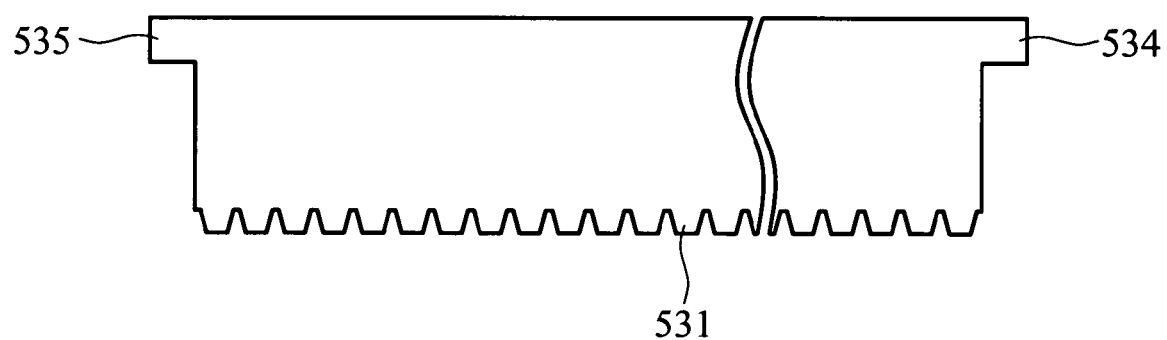
FIG. 3b is a schematic diagram of a metal plate in accordance with the present invention.

Referring to FIGS. 3a and 3b, a second embodiment of the motor rotor of the present invention includes a hub 51, a metal plate 53 and a magnet 55. The metal plate 53 is disposed in the hub 51, and the metal plate 53 has a serrated edge 531. The magnet 55 is disposed in the ring-shaped metal plate 53 and supported by the serrated edge 531.

As shown in FIG. 3a, the hub 51 and the metal plate 53 are both ring-shaped. After bending, the serrated edge 531 is perpendicular to the central axis of the hub 51 such that the metal plate 53 securely connects the hub 51 by the serrated edge 531. After assembly, the ring-shaped metal plate 53 is maintained by a radial force of the hub 51.

In the embodiment, the metal plate 53 has two salient teeth 536, and the hub has a recess 516. The salient teeth 536 are inserted into the recess 516 to maintain the ring-shaped metal plate 53.

A method for manufacturing and assembling the motor rotor of the second embodiment is described in the following.

Figure 3C:
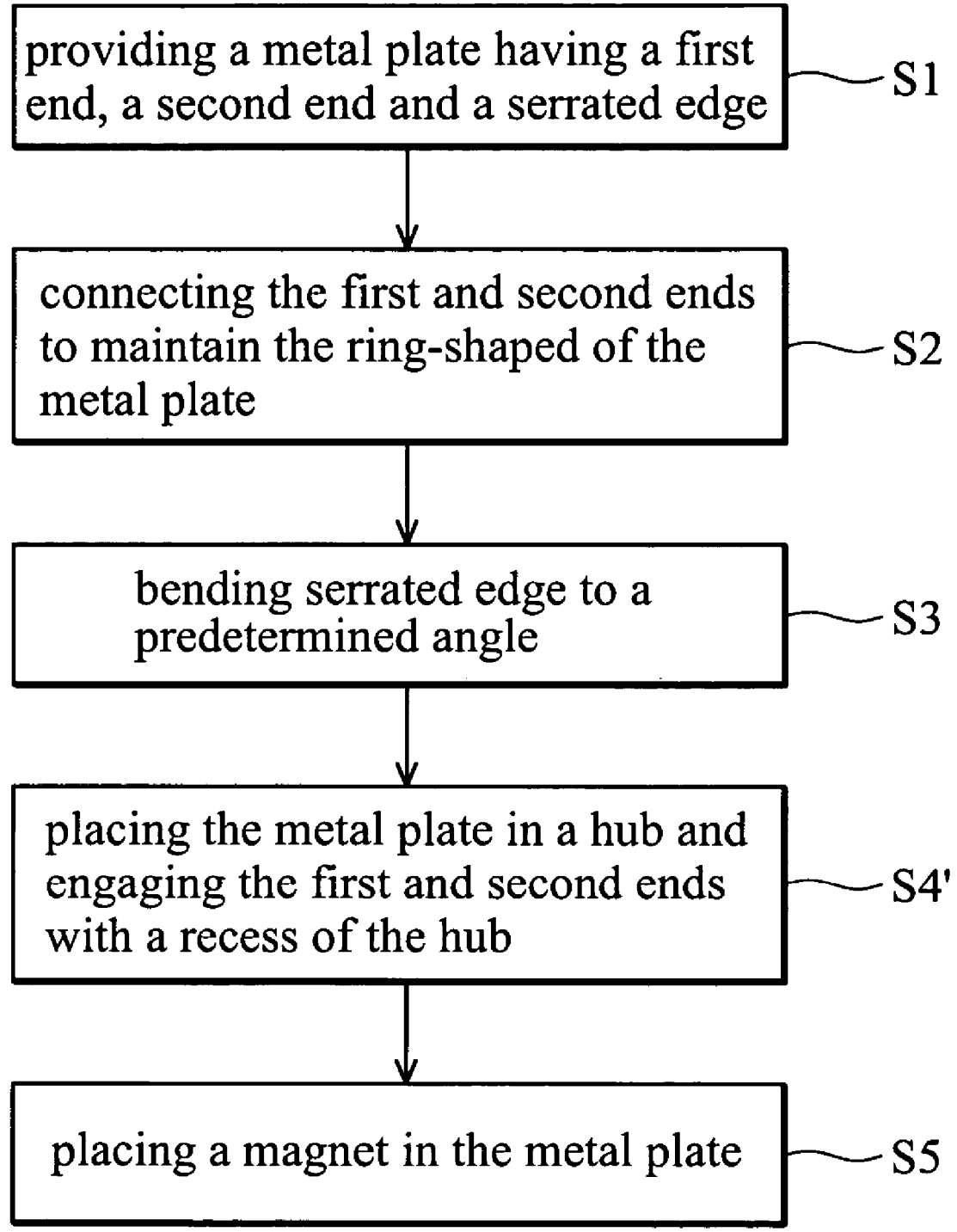
FIG. 3c is a flow chart of the method for manufacturing the motor rotor of the second embodiment.

Referring to FIGS. 3a, 3b and 3c, a method for manufacturing a motor rotor includes providing a metal plate with a first end, a second end and a serrated edge (step S1); connecting the first and second ends to maintain the ring-shaped metal plate (step S2); bending the serrated edge to a predetermined angle (step S3); placing the ring-shaped metal plate in a hub, inserting the first and second ends into a recess (step S4'); and placing a magnet in the metal plate (step S5).

In step S1, the metal plate includes the first end 534, the second end 535 and the serrated edge 531.

In step S2, the metal plate is molded by a roller, and the first end 534 and the second end 535 are connected together to form a ring.

In step S3, the serrated edge 531 is bent to the predetermined angle to form the top of the metal plate 43.

In step S4', the metal plate 53 is disposed in the hub 51. The hub 51 is ring-shaped and has a recess 516. In the embodiment, the metal plate 53 has the serrated edge 531 and after bending, the serrated edge 531 is located at a plane perpendicular to the central axis of the hub 51 such that the metal plate 53 is securely connected to the hub 51 by the serrated edge 531. After assembly, the ring-shaped metal plate 53 is maintained by a radial force of the hub 51.

Further, the first end 534 and the second end 535 correspond. In the embodiment, the first and second ends 534 and 535 are two salient teeth 536. The two teeth 536 engage with the recess 516. After assembling the salient teeth 536 and the recess 516, the deformation of the metal plate 53 and rotation thereof are prevented.

Figure 4A:
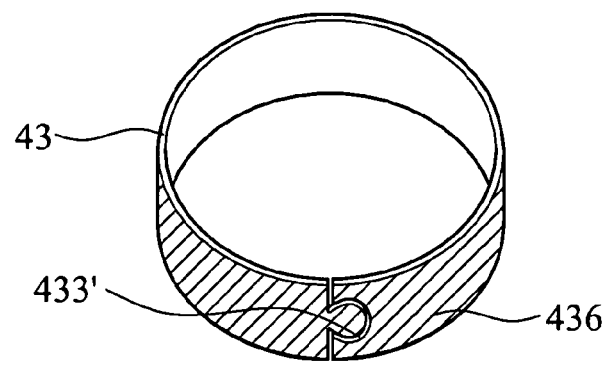
FIG. 4a is a schematic diagram of one type of the metal plate according to the present invention.
Figure 4B:
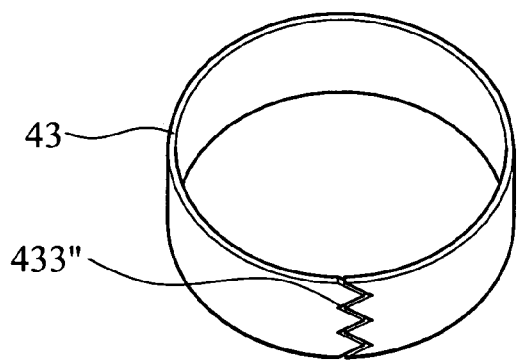
FIG. 4b a is schematic diagram of another type of metal plate according to the present invention.
Figure 4C:
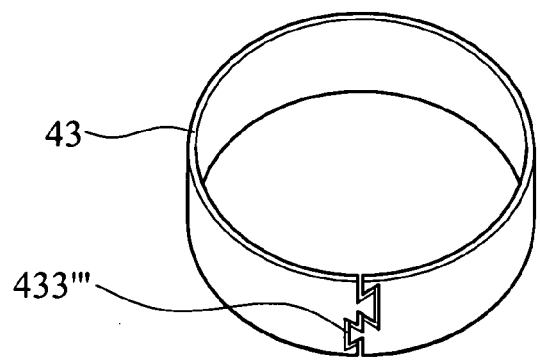
FIG. 4c is a schematic diagram of a third type of metal plate according to the present invention.

Additionally, the occlusive seam mentioned above can take other forms such as seams 433', 433'' and 433''' as shown in FIGS. 4a, 4b and 4c, as long as the profile of the first and second ends are corresponded. After engagement, the movement of the metal plate along the axial direction and separation of the two ends can be prevented, thus maintaining the ring-shaped metal plate.

Further, a pressure generating pattern 436 may be formed on the surface of the metal plate as shown in FIG. 4a. The pattern 136 provides the stress and increases the friction between the metal plate and the hub.

Otherwise, after bending, the serrated edge of the metal plate is located at a plane perpendicular to the central axis of the hub such that the metal plate is securely connected to the hub. Namely, after bending, the serrated edge forms a flat surface and supports the magnet. A metal plate as shown in FIGS. 4a, 4b and 4c without a serrated edge also achieves the same result.

Finally, while the invention has been described by way of example and in terms of the preferred embodiments, it is to be understood that the invention is not limited to the disclosed embodiments. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A motor rotor adapted to be used in a fan, comprising:
a hub;
a metal plate having a first end and a second end to be disposed in the hub; and
a magnet disposed in the metal plate;
wherein the metal plate further comprises salient teeth, and the hub has a recess engaging the salient teeth to shape the metal plate as a ring.

2. The motor rotor as claimed in claim 1, wherein the hub is ring-shaped and has a flange extending toward the center of the hub to support the metal plate.

3. The motor rotor as claimed in claim 2, wherein the metal plate further comprises a serrated edge to support the magnet.

4. The motor rotor as claimed in claim 3, wherein the metal plate is ring-shaped, and the serrated edge contacts an inner surface of the flange.

5. The motor rotor as claimed in claim 1, wherein at least one blade is disposed at the exterior periphery of the hub.

6. The motor rotor as claimed in claim 1, wherein the first and second ends are engaged together to form an occlusive seam to shape the metal plate as a ring.

7. The motor rotor as claimed in claim 1, wherein the surface of the metal plate has a pressure generating pattern to provide a stress and increase a friction between the metal plate and the hub.

8. A motor rotor adapted to be used in a fan, comprising:
a hub having a recess;
a metal plate having a first end and a second end to be disposed in the hub and comprising a salient tooth, wherein the recess engages the salient tooth to shape the metal plate as a ring; and
a magnet disposed in the metal plate.

9. A motor rotor adapted to be used in a fan, comprising:
a hub;
a metal plate having a first end and a second end to be disposed in the hub and comprising a serrated edge; and
a magnet disposed in the metal plate, wherein the serrated edge supports the magnet.

* * * * *